United States Patent [19]

Faulring

[11] Patent Number: 4,941,416

[45] Date of Patent: Jul. 17, 1990

[54] ACTUATING MECHANISM FOR A GROUND-ENGAGING TOOL

[76] Inventor: Frank W. Faulring, 4841 Genesee Rd., North Collins, N.Y. 14111

[21] Appl. No.: 278,673

[22] Filed: Dec. 1, 1988

[51] Int. Cl.$^5$ .................. A01C 11/02; A01B 49/04
[52] U.S. Cl. ............................ 111/102; 172/21; 172/95; 111/115
[58] Field of Search .................. 111/89, 90–93, 111/100, 102, 115, 104, 105, 118, 128; 172/21, 22, 95, 93

[56] References Cited

U.S. PATENT DOCUMENTS

| | | | |
|---|---|---|---|
| 2,236,562 | 4/1941 | Brandes | 172/22 |
| 2,347,748 | 5/1944 | Melling | 172/21 |
| 2,626,578 | 1/1953 | Morine | 111/115 |
| 3,136,274 | 6/1964 | Townsend | 172/21 |
| 3,161,163 | 12/1964 | Cosner | 111/3 |
| 3,176,635 | 4/1965 | Mabon | 111/3 |
| 3,333,557 | 8/1967 | Kappelmann et al. | 111/91 |
| 3,460,493 | 8/1969 | Stephenson et al. | 111/3 |
| 3,802,513 | 4/1974 | Ploenges | 172/21 |
| 3,945,330 | 3/1976 | Leavett et al. | 111/1 |
| 4,236,582 | 12/1980 | Hastings | 172/22 |
| 4,396,508 | 12/1981 | Skipper | 111/1 |
| 4,458,608 | 7/1984 | du Brucq et al. | 111/3 |
| 4,569,400 | 2/1986 | Minagawa et al. | 172/21 |

OTHER PUBLICATIONS

"Renaldo's E-Z Way", Renaldo's Sales & Service Center, Inc., undated.

*Primary Examiner*—Danton D. DeMille
*Attorney, Agent, or Firm*—Sommer, Oliverio & Sommer

[57] ABSTRACT

An actuating mechanism (20) for a ground-engaging tool is arranged as a swinging parallelogram such that the tool has varying components of velocity in the horizontal and vertical directions. The mechanism is synchronized such that the tool has a rearwardly-directed velocity component substantially equal to the forward ground speed of the frame, when the tool is in the vicinity of its bottom dead center position. Hence, the tool has a substantially-zero net horizontal velocity as it engages the ground. The tool may include a burner head (25) and/or an injector mechanism (26) for planting a pneumatically-delivered seed-vermiculite mixture through a sheet of imperforate plastic mulch.

21 Claims, 2 Drawing Sheets

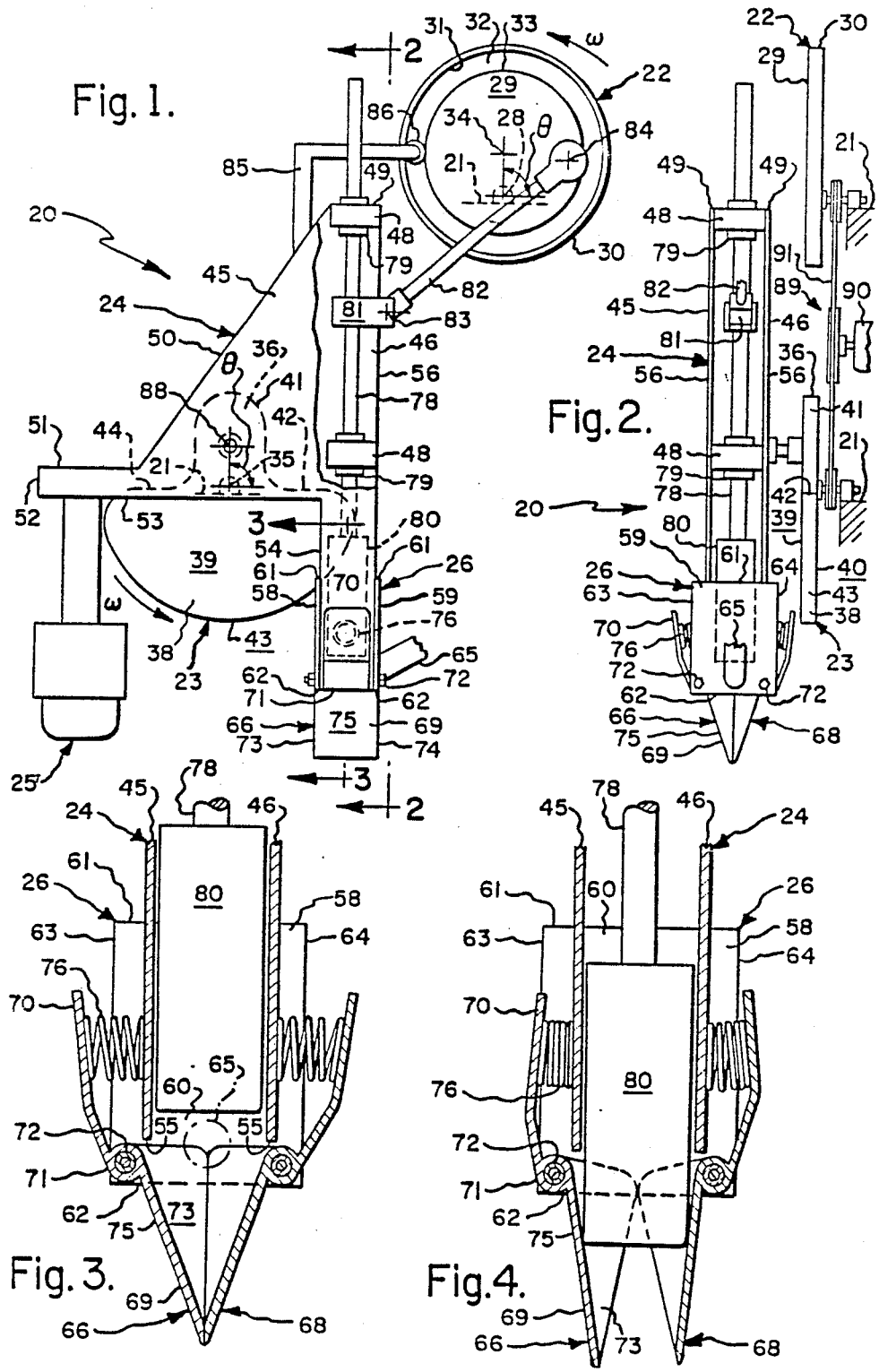

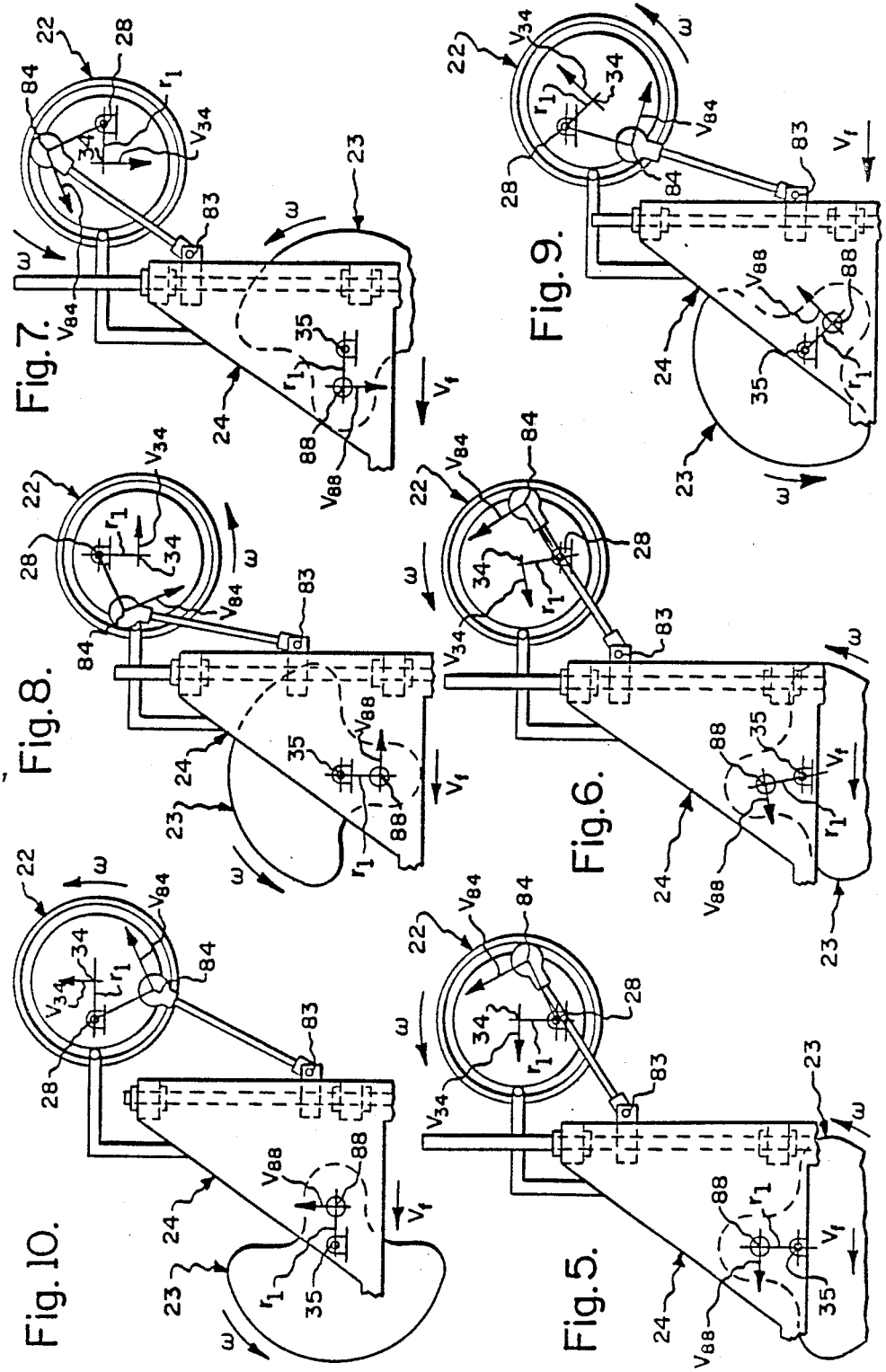

ACTUATING MECHANISM FOR A GROUND-ENGAGING TOOL

TECHNICAL FIELD

This invention relates generally to the field of agricultural and construction vehicles having a frame adapted to be translated along the ground, and, more particularly, to an improved actuating mechanism for selectively raising and lowering a tool from a moving vehicle in such a manner that the tool has a substantially-zero net horizontal velocity as it engages the ground.

BACKGROUND ART

Many types of ground-engaging tools are used in agriculture and the construction industry. Some tools (e.g., plows, harrows, brooms and the like) are carried by a vehicle (e.g., a tractor-drawn implement, self-propelled, etc.) and are adapted to be moved relative to the ground. However, it is sometimes desired to move a tool vertically relative to the ground, while being translated therealong, without any relative horizontal movement therebetween when the tool is in a lowered ground-engaging position.

Modern farming is a continuing struggle with economics. Various machines have been developed to reduce labor. However, these machines are often capital-intensive. On the other hand, the farmer who does not invest in such equipment often finds his operation to be unduly labor-intensive. Labor is not only expensive, but may simply not be available at critical times.

In recent years, increasing attention has been directed toward raised-bed mulch-covered farming. Such raised beds provide for improved drainage, and provide elevated seedbeds with defined aisles therebetween. The mulch is typically in the form of a much-elongated generally-rectangular sheet of plastic, and is used to cover the seedbed. Such mulch inhibits the growth of undesired weeds, and provides some control on evaporation. Both of these factors tend to increase the farmer's yield and reduce his costs.

Various techniques have been developed to use plastic mulch on raised seedbeds. According to one technique, the seedbed was prepared, planted, and was then physically covered with a sheet of imperforate plastic mulch. Thereafter, a laborer physically cut slits through the mulch at spaced locations therealong to allow for penetration of desired plant growth. While functionally operative, this technique was unnecessarily labor intensive.

Another known technique, such as the "E-Z Way Planter" manufactured by Renaldo's Sales & Service Center, Inc., 1770 Mile Strip Road, North Collins, N.Y. 14111, provided a tractor-drawn planter having a tool bar which was moved vertically upwardly and downwardly relative to the ground as the planter was moved along the seedbed. A gas-fired heated burner head was mounted on this tool bar to physically burn a hole in the mulch sheet when moved downwardly to engage it. A planter mechanism was adapted to inject an ideally-homogeneous mixture of seed and vermiculite through the just-burned hole. Thus, when the tool bar was lowered, the burner head melted a hole through the mulch, and the planter injected a plug of the seed-and-vermiculite mixture through the previously-burned hole. The tool bar was then moved upwardly, and, after being translated further along the seedbed, the burner head was again lowered to burn another hole, while the injector planted the mixture through the hole just burned. The planter mechanism was typically in the form of a rotatable ground-engaging "ferris wheel"-like device which was rotated so as to have a substantially-zero net horizontal velocity relative to the mulch sheet. On the other hand, the burner head was typically mounted for simple vertical movement relative to the horizontally-moving frame. Hence, the burner head had a continuous horizontal velocity component relative to the ground, even when it engaged the mulch. The consequence of this was that the burned holes were often elliptical, rather than circular, and, in some cases, the moving burner head actually tore or ripped the mulch.

Other types of ground-engaging tools are shown and described in U.S. Pat. Nos. 3,333,557 (Kappelmann et al.) [Class 111/Subclass 91], 3,460,493 (Stephenson et al.) [Class 111, Subclass 3], 3,945,330 (Leavitt et al. [Class 111/Subclass 1], 4,306,508 (Skipper) [Class 111, Subclass 1], 3,161,163 (Cosner et al.) [Class 111, Subclass 3], 4,458,608 (duBrucq) [Class 111, Subclass 3], and 3,176,635 (Mabson) [Class 111, Subclass 3].

Accordingly, it would be generally desirable to provide an improved through-the-mulch planter having an improved actuating mechanism which would selectively lower the tool bar to a ground-engaging position with substantially-zero net horizontal velocity relative to the seedbed so as to avoid damaging the mulch.

DISCLOSURE OF THE INVENTION

This invention broadly provides an improved actuating mechanism for controlling the movement of one or more tools (e.g., burner heads, planter mechanisms, or the like) which is or are adapted to selectively engage the ground while being translated therealong.

The improved mechanism comprises: a frame (i.e., pushed, pulled, or self-propelled) which is adapted to be translated along the ground at a horizontal ground speed; a cam mounted on the frame for rotational movement relative thereto about a first axis, the cam having a cam surface configured as a surface of revolution generated about a second axis positioned eccentrically with respect to the first axis; link means, such as a crank, forming a link, this link having one marginal end portion mounted on the frame for rotational movement relative thereto about a third axis and having another marginal end portion; a member mounted on such link other marginal end portion for rotational movement relative thereto about a fourth axis, this member also having a follower arranged to engage the cam surface, the cam and link being so oriented and arranged with respect to one another that a straight-line drawn between the first and second axes will always be substantially parallel to a similar line drawn between the third and fourth axes, so as to maintain the spatial orientation of the member as the cam and link rotate about their respective rotational axes with the frame, the member having a horizontal velocity component which is sinusoidal and also having a vertical velocity component arranged substantially 90 degrees out-of-phase with respect to the horizontal component, this member also carrying at least one tool; and motor means for rotating at least one of the cam and link means about its rotational axis with the frame in an angular direction and at an angular speed such that, when the member is in the vicinity of its bottom dead center position, the horizontal velocity component of the member relative to the frame will be substantially equal to, but opposite, the translational speed of the frame relative to the ground; whereby the tool may be selectively lowered to engage the ground at a substantially-zero net horizontal speed relative thereto.

Accordingly, the general object of the invention is to provide an improved actuating mechanism for selectively lowering a tool bar from a moving vehicle (i.e., either pushed, pulled, or self-propelled) such that the tool bar has a substantially-zero net horizontal velocity relative to the ground in the vicinity of its most-lowered position.

Another object is to provide an improved actuating mechanism for selectively moving a planter burner head so as to minimize the possibility of burning or tearing a sheet of plastic mulch covering the seedbed.

Still another object is to provide an improved mechanism for selectively injecting a fluidized mass of seed and vermiculite into the ground.

These and other objects and advantages will become apparent from the foregoing and ongoing written specification, the drawings, and the appended claims.

BRIEF DESCRIPTION OF THE DRAWINGS

FIG. 1 is a fragmentary schematic left side elevational view of the improved actuating mechanism showing the cam, crank, movable member, actuating rod, burner head and injector, with portions of the movable member being broken away to show the manner by which the actuating rod is slidably mounted on such member.

FIG. 2 is a fragmentary schematic transverse vertical sectional view thereof, taken generally on line 2—2 of FIG. 1.

FIG. 3 is an enlarged fragmentary transverse vertical sectional view thereof, taken generally on line 3—3 of FIG. 1, showing the downwardly-moving plunger as being arranged within the chamber, but with the jaws still in their closed positions.

FIG. 4 is a view generally similar to FIG. 3, but showing the plunger as having moved further downwardly to spread the jaws to their opened positions and to forcibly expel the plantable mixture from the chamber.

FIG. 5 is a further-schematized fragmentary view of the actuating mechanism, showing the cam and crank arms as being in their respective 12 o'clock positions.

FIG. 6 is a view generally similar to FIG. 5, but showing the cam and crank arms as having been rotated past their respective 12 o'clock positions such that the connecting rod overlies the cam first axis.

FIG. 7 is a view generally similar to FIG. 6, but showing the cam and crank arms as being in their respective 9 o'clock positions.

FIG. 8 is a view generally similar to FIG. 7, but showing the cam and crank arms as being in their respective 6 o'clock positions.

FIG. 9 is a view generally similar to FIG. 8, but showing the cam and crank as being in one particular angular position relative to the frame, at which the longitudinal axis of the connecting rod is aligned with, but does not overlie, the cam axis.

FIG. 10 is a view generally similar to FIG. 9, but showing the cam and crank arms as being in their respective 3 o'clock positions.

MODE(S) OF CARRYING OUT THE INVENTION

At the outset, it should be clearly understood that like reference numerals are intended to identify the same parts, portions or surfaces consistently throughout the several drawing figures, as such parts, portions or surfaces may be further described or explained by the entire written specification of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" simply refer to the orientation of a surface relative to its axis of elongation, or axis of rotation, as appropriate.

Referring now to the drawings and, more particularly, to FIGS. 1 and 2 thereof, the presently-preferred form of the improved actuating mechanism, generally indicated at 20, is shown as broadly including fragmentary portions of a vehicle frame, severally indicated at 21; a cam 22; a crank 23; and a member 24 carrying a burner head 25 and an injector 26.

Since the drawings are schematic, only necessary portions of frame 21 have been shown to avoid obfuscating the operative portions of the improved actuating mechanism. This frame may be a self-propelled steerable vehicle, or some other type of pushed or pulled wheeled frame. In the preferred form, the frame is tractor-drawn. In any event, frame 21 is adapted to be translated forwardly (i.e., leftwardly in FIG. 1) along the ground in the direction of the arrow at a substantially-constant horizontal ground speed $V_f$.

Cam 22 is a vertically-disposed circular disc-like element mounted on the frame for rotation about an eccentrically-positioned horizontal first axis 28. The cam has a circular vertical left face 29 (i.e., which faces the reader in FIG. 1), a circular vertical right face (not shown), and a outwardly-facing cylindrical surface 30 extending therebetween. An annular trough-like recess extends into the cam from its left face. This recess is bounded by an inwardly-facing cylindrical surface 31, a leftwardly-facing annular vertical bottom surface 32, and an outwardly-facing cylindrical surface 33. Recess surfaces 31–33, as well as cam outer surface 30, are severally generated about the central horizontal or second axis 34 of the cam. In FIG. 1, cam 22 is shown as being mounted for rotation in a counterclockwise direction about eccentric first axis 28 at an angular speed of $\omega$ radians/second.

Still referring principally to FIGS. 1 and 2, crank 23 is shown as being a vertically-disposed specially-configured plate-like member mounted on the frame for rotation about a horizontal third axis 35. The crank is shown as having one upper portion 36 (i.e., above axis 35) forming a link, and having a large-mass lower portion 38 (i.e., below axis 35) acting as a counterweight. The crank has vertical left and right side faces 39, 40, and an outwardly-facing peripheral surface extending therebetween. More particularly, this outer surface sequentially includes (proceeding in a clockwise direction in FIG. 1): an uppermost inverted U-shaped surface 41 surrounding link portion 36, an upwardly-facing horizontal surface 42 tangentially joining surface 41 and extending rearwardly (i.e., rightwardly in FIG. 1)

therefrom, a downwardly-facing semi-cylindrical surface 43, and an upwardly-facing horizontal surface 44 leaving surface 43 and rejoining the forward margin of surface 41. The connections between adjacent surfaces 41–44 are shown as being in smooth arcuate continuous transition. Thus, the counterweight portion 38 is bounded by surfaces 42, 43, 44, while the portion within inverted U-shaped surface 41 constitutes the link-defining portion 36, as hereafter explained.

Member 24 is shown as being a subassembly which generally comprises two transversely-spaced specially-configured vertical left and right plates 45, 46. Suitable spacers, severally indicated at 48 in FIG. 2, extend between, and are suitably fastened to, these plates so as to maintain the horizontal spacing therebetween. Each plate has the same general outline or shape, and is sequentially bounded by (proceeding in a counterclockwise direction in FIG. 1): a horizontal planar upper edge 49, a forwardly-and upwardly-facing inclined planar edge 50, an upwardly-facing horizontal planar edge 51 extending forwardly therefrom, a forwardly-facing vertical planar edge 52 extending downwardly therefrom, a downwardly-facing horizontal planar edge 53 extending rearwardly therefrom, a forwardly-facing vertical edge 54, a downwardly-facing horizontal edge 55 (FIGS. 3–4), and a rearwardly-facing vertical edge 56 extending upwardly therefrom to join the right margin of upper edge 49. Transversely-extending front and rear rectangular vertical plates 58, 59 are fastened to the plate front and rear edges 54, 54 and 56, 56, respectively, to define a vertically-elongated tubular chamber 60, having a rectangular transvere cross-section therewithin, immediately above its open lower end. As best shown in FIGS. 2–4, each of plates 58, 59 is bounded by upper and lower horizontal edges 61, 62, and by left and right vertical edges 63, 64, respectively.

As shown in FIGS. 1 and 2, an upwardly- and rearwardly-inclined tubular conduit, partially indicated at 65, communicates with chamber 60. This conduit is arranged to supply a fluidized seed and potting soil mixture into chamber 60. In the preferred embodiment, seed discharged from a singulator (not shown) is suitably injected into a pneumatic stream which also contains vermiculite or the like. The fluidized seed-vermiculite mixture is thus blown into chamber 60 to accumulate between the closed jaws, described infra, until discharged.

As best shown in FIGS. 3 and 4, the open lower end of chamber 60 is selectively closed by a pair of cooperative left and right jaws 66, 68 which are biased to move toward one another to a closed position, and which somewhat resembles a clamshell. These jaws are structurally identical, and are simply mounted on the member as mirror images of one another. Hence, only the left jaw will be specifically described, it being understood that the right jaw has the corresponding parts, portions or surfaces, albeit oppositely arranged.

Left jaw 66 is an intermediately-pivoted member having a lower portion 69 adapted to penetrate the ground, and having an upper lever portion 70. These two portions are separated by an intermediate horizontal barrel portion 71 through which a pivot pin 72 extends fore-and-aft. As best shown in FIGS. 1 and 2, this pivot pin may be in the form of a horizontally-elongated bolt having its head portion engaging rear plate 59, having its shank portion passed through barrel portion 71 and through a pair of aligned horizontal holes (not shown) provided through plates 58, 59 adjacent the lower left corners thereof, and having its threaded marginal end portion extending forwardly beyond the forward plate 58. A nut may be threaded on to this exposed bolt end portion to prevent unintended separation of the left jaw from the member. Of course, suitable washers, lock-nuts, retaining rings or the like may be operatively employed to maintain the bolt in this operative position, while permitting pivotal movement of the jaws relative to the member.

The left jaw lower portion is somewhat of a scoop-shaped member having its front and rear end walls 73, 74 configured as vertically-disposed right triangles, and with a downwardly- and leftwardly-facing base wall 75 extending therebetween. The lever portion extends upwardly and slightly forwardly from barrel portion 71. The entire jaw 66 may be formed either integrally (as shown) or separately, as desired. A coil spring 76 is operatively arranged to act between left plate 45 and jaw lever portion 70. Spring 76 is compressed, and therefore urges the entire left jaw to rotate in a counterclockwise direction, as seen in FIGS. 3 and 4, about the horizontal axis of pivot pin 72. As previously mentioned, the right jaw 68 is structurally identical, although simply configured as a mirror image of the left jaw. Thus, springs 76, 76 continuously bias the jaw lower portions to move relatively toward one another to form an inverted hopper-like structure, which closes the lower end of the chamber. As will be described herein, these jaws may be selectively caused to pivot in the appropriate angular directions so as to permit the seed-vermiculite mixture accumulating therein to be forcibly ejected from the chamber.

In the preferred embodiment, the injector 26 includes an actuating rod 78 (FIGS. 1 and 2) mounted on the member for movement therewith and for vertical sliding movement relative thereto. To this end, a pair of vertically-spaced slide bearings, severally indicated at 79, are operatively held in the space between the two side plates 45, 46. Rod 78 is mounted within these bearings for upward and downward sliding movement relative to the frame. A vertically-elongated plunger 80, having a substantially-rectangular transverse cross-section, is mounted on the lower marginal end portion of this rod for movement toward and away from the jaw lower portions, as best shown in FIGS. 3 and 4.

A lug 81 is mounted fast to an intermediate portion of rod 78 between bearings 79, 79. A connecting rod 82 has one marginal end portion connected to this lug for pivotal movement about a fifth axis 83, and has its other marginal end portion connected to the cam for rotation about a sixth axis 84. An inverted L-shaped guide member 85 is mounted fast to member 24 and has a freely-rotatable roller 86 mounted on its distal end. This roller is operatively arranged on the cam recess defined by surfaces 31–33. Thus, the right end of guide member 85 is confined to move within the cam recess, which is mounted for eccentric movement about axis 28, so as to maintain the upright spatial orientation of member 24 as the cam and crank rotate about their respective axes with the frame.

Member 24 is mounted on the distal end of the crank link portion 36 for rotation relative thereto about fourth horizontal axis 88. The arm distance $r_1$ between first and second cam axes 28, 34 is substantially the same as the arm distance $r_1$ between the crank third and fourth axes 35, 88. Moreover, the cam and crank rotate simultaneously in the same angular direction at substantially the same angular speed ($\omega$), to maintain a synchronized or common angular orientation between the arms during their respective rotations. In other words, when the cam second axis 34 is in its 3, 12, 9 and 6 o'clock positions relative to cam first axis 28, the crank fourth axis 88 is similarly in its 3, 12, 9 and 6 o'clock positions relative to crank third axis 35, respectively. Otherwise stated, the arm $r_1$ between cam axes 28, 34 will always be substantially parallel to the arm $r_1$ between crank axes 35, 88. It therefore necessarily follows that such imaginary lines will be oriented at substantially the same angle $\theta$ with respect to a common frame of reference. Hence, if $\theta = 0°$ when the imaginary lines are in their 3 o'clock positions, then $\theta = 90°$ when the imaginary lines are in their 12 o'clock positions, $\theta = 180°$ when such lines are in their 9 o'clock positions, $\theta = 270°$ when such lines are in their 6 o'clock positions, and $\theta = 360°$ when such lines are in their 3 o'clock positions. Thus, such lines are analogous to the parallel legs of a swinging parallelogram. This configuration, together with guide 85, maintains the spatial orientation of member 24 at all angular positions of the cam and crank arms $r_1$, $r_1$.

As best shown in FIG. 2, motor means, generally indicated at 89, are operatively arranged to rotate the cam and crank simultaneously about their respective frame axes, 28 and 34, respectively, in the same angular direction and at substantially the same angular speed ($\omega$). In the preferred embodiment, the motor means comprises a suitable motor 90, and an endless chain 91 operatively engaging appropriate sprockets (not shown) mounted fast to shafts coincident with axes 28, 35. Alternatively, the cam and crank could be rotated independently by separate motors, or by some other means, as desired.

Operation

The operation of the improved mechanism is comparatively illustrated in FIGS. 5-10. The structure shown in these figures has been further schematized by omission of the burner head and portions of the injector mechanism. However, it should be remembered that these two elements are mounted on member 24 for movement therewith.

FIGS. 5-10 depict six sequential angular positions of the cam and crank arms during one complete revolution. In each of these views, the cam and crank axes with the frame, 28 and 35, respectively, are shown as being in the same relative positions. It is also assumed that the frame is being translated forwardly (i.e., leftwardly in FIGS. 5-10) along the ground at a substantially-constant horizontal velocity $V_f$, and that the motor means is arranged to rotate each of the cam and crank simultaneously in a counterclockwise direction (i.e., as seen in FIGS. 5-10) at an angular speed of $\omega$ radians per second. It should also be remembered that the velocity (V) of a point on a rotating body is the product of the angular speed ($\omega$) and the arm distance (r) between the point-in-question and the axis of rotation. The velocity of this point is always normal (i.e., perpendicular) to the arm distance.

In the following description, the 3 o'clock positions of the cam and crank will be used as the frame of reference, with $\theta$ representing the angle between the 3 o'clock position and the arms $r_1$ between the first and second axes 28, 34 and between the third and fourth axes 35, 88, respectively. Thus, when arms $r_1$ are in the 3 o'clock positions, $\theta = 0°$, when arms $r_1$ are in the 12 o'clock positions, $\theta = 90°$, and so on.

Referring first to FIG. 5, the second and fourth axes, 34, 88, are shown as being in their respective 12 o'clock positions relative to the first and third axes 28, 35, respectively (i.e., $\theta = 90°$). Since the arm distance $r_1$ between the first and second axes 28, 34 is the same as the arm distance $r_1$ between the third and fourth axes 35, 88, the velocities of the second and fourth axes, respectively represented by vectors $V_{34}$ and $V_{88}$, will necessarily be of the same magnitude. In fact, since these arms are always parallel, velocity vectors $V_{34}$ and $V_{88}$ will always be parallel to one another. Thus, in FIG. 5, vectors $V_{34}$ and $V_{88}$ are shown as being directed forwardly (i.e., leftwardly). This represents the top dead center position of tool-carrying member 24 relative to the frame. At the same time, the velocity of member 24 relative to the ground $V_{24/g}$ is the vector sum of the velocity of the frame relative to the ground $V_f$ and the velocity of the fourth axis relative to the frame $V_{88}$. Or, $$V_{24/g} = V_f + V_{88}$$

Thus, when member 24 is in its top dead center position relative to the frame, velocity vectors $V_f$ and $V_{88}$ both act leftwardly, and are additive. Hence, the elevated member 24 moves quickly in a forward direction. At the same time, pivotal axis 84 has a velocity $V_{84}$ relative to the frame perpendicular to the arm distance $r_2$ between first axis 28 and point 84. Arms $r_1$ and $r_2$ are separated by an included angle (i.e., angle 84-28-34) of about 62°. Moreover, arm $r_2$ is about twice the length of arm $r_1$. Since $r_2$ is greater than $r_1$, it follows that the magnitude of $V_{84}$ is greater than the magnitude of $V_{34}$. Hence, when member 24 is in its 12 o'clock position (i.e., $\theta = 90°$), the slide member is still moving upwardly relative to member 24.

FIG. 6 depicts the cam and crank as having been rotated slightly further to a position at which $\theta$ = about 100°. In this angular position, velocity vectors $V_{88}$ and $V_{34}$ are directed forwardly and slightly downwardly. These vectors may be broken down into horizontal and vertical components. Thus, in FIG. 6, vector $V_{34}$ has a forwardly-directed horizontal component $V_{34x}$ and a downwardly-directed vertical component $V_{34y}$, while vector $V_{88}$ has a forwardly-directed horizontal component $V_{88x}$ and a downwardly-directed vertical component $V_{88y}$. Since component $V_{88x}$ in FIG. 6 is less than $V_{88}$ in FIG. 5, the horizontal velocity of point 88 in FIG. 6 is less than in FIG. 5. Hence, in FIG. 6, the horizontal velocity of member 24 relative to the frame has begun to slow relative to that shown in FIG. 5. At the same time, point 88 now has a vertical velocity component $V_{88y}$, and it has begun to move downwardly toward the ground. FIG. 6 also shows point 84 as having a velocity $V_{84}$ relative to the frame, which is directed upwardly and forwardly. Vector $V_{84}$ may be broken down into its horizontal and vertical components $V_{84x}$ and $V_{84y}$, respectively. However, since rod 78 is constrained to move horizontally with member 24 (i.e., $V_{83x} = V_{88x}$), it can be seen that the slide member is still moving upwardly relative to the downwardly-moving member.

FIG. 7 shows the cam and crank arms as being in their respective 9 o'clock positions such that $\theta = 180°$. Since arms $r_1$ are horizontal, it follows that velocity vectors $V_{34}$ and $V_{88}$ are now vertical, and point downwardly. In other words, $V_{88x} = 0$ and $V_{88y} = V_{88}$. Hence, member 24 is now moving downwardly relative to the frame at the velocity of $V_{88}$. Since $V_{88x} = 0$, the horizontal speed of member 24 relative to the ground is equal to $V_f$. Or, $$V_{24/g} = V_f + V_{88} = V_f + 0 = V_f$$

At the same time, velocity vector $V_{84}$ points forwardly and downwardly. This vector has a downward velocity component, albeit smaller than $V_{88}$. Hence, the slide member is approaching its uppermost position relative to downwardly-moving member 24.

FIG. 8 depicts the cam and crank arms as being in their respective 6 o'clock positions relative to the frame (i.e., $\theta = 270°$). This represents the bottom dead center position of member 24 relative to the frame. Hence, velocity vectors $V_{34}$ and $V_{88}$ are both horizontal, and point rearwardly. The angular speed $\omega$ of the cam and crank is adjusted such that $V_{88}$ is substantially equal to $V_f$. Hence, these two horizontal velocities oppose and substantially cancel one another. The significance of this is that when member 24 is at its most-lowered ground-engaging position, the rearwardly-directed velocity $V_{88}$ of member 24 relative to the frame, is substantially equal and opposite to the forwardly-directed velocity $V_f$ of the frame relative to the ground. Hence, in this condition, member 24 has substantially-zero net horizontal velocity relative to the ground. At the same time, point 88 has no vertical velocity component. However, velocity vector $V_{84}$ is pointed downwardly and rearwardly. Hence, when member 24 is in its most-lowered position, the slide is still moving downwardly relative to the frame. As this happens, the plunger moves downwardly to enter chamber 60 more deeply in preparation for expressing the contents therefrom.

FIG. 9 depicts the cam and crank axes as being approximately in their 4:30 o'clock positions relative to the frame (i.e., $\theta = 315°$). In this condition, velocity vector $V_{88}$ has an upwardly-directed vertical component $V_{88y}$, and a rearwardly-directed horizontal component $V_{88x}$. This rearward component partially cancels the forward ground speed $V_f$. Hence, in FIG. 9, member 24 has some, albeit small, net forward velocity relative to the ground. At the same time, however, member 24 has begun to move upwardly relative to the frame, and the burner and injector have begun to withdraw from their deepest ground-penetrating positions. At this point, the slide member has reached its lowermost position relative to the frame. However, member 24 is moving upwardly relative to the lowermost slide, with the effect that the plunger is moved deeper into chamber 60 to forcibly open jaws 66, 68 and to eject the seed-vermiculite mixture from chamber 60 as member 24 moves upwardly after passing by its bottom dead center position.

FIG. 10 depicts the cam and crank as being in their 3 o'clock positions (i.e., $\theta = 360° = 0°$). In this condition, velocity vector $V_{88}$ points upwardly, and has no horizontal component. Hence, the horizontal velocity of member 24 relative to the ground is substantially equal to the velocity of the frame relative to the ground $V_f$. However, member 24 is moving upwardly at its maximum velocity $V_{88}$. The slide member is also moving upwardly, but at a lesser velocity. In other words, member 24 is still moving upwardly relative to the slide member. Hence, FIG. 10 illustrates the condition at which material is still being ejected from the chamber.

The horizontal and vertical velocities of member 24 relative to the frame are both sinusoidal functions of angle $\theta$, although 90° out-of-phase with respect to one another. Thus, if $V_{88x} = f(\sin \theta)$, then $V_{88y} = f(\cos \theta)$. The vertical motion of member 24 relative to the ground is a simple sinusoidal function. However, the horizontal motion of member 24 relative to the ground is the vector sum of the ground speed of the frame $V_f$ and the horizontal component of vector $V_{88}$. Near its top dead center position (i.e., when the burner head and injector are elevated above the ground), these two vectors point forwardly and are additive. Hence, the elevated member moves quickly ahead. However, as the member moves downwardly toward the ground, the horizontal velocity component of the member relative to the frame $V_{88x}$ decreases, ultimately changes direction (i.e., at $\theta = 180°$), and begins to increase in magnitude to as to substantially cancel the forward horizontal ground speed of the frame when the member is in its lowermost position (i.e., at $\theta = 270°$). After passing by this position, and as the member begins to move upwardly therefrom, the contents of the chamber are expressed by relative motion between the plunger and chamber. As it approaches its uppermost position, its forwardly-acting velocity component increases. Hence, the member moves quickly ahead.

The horizontal and vertical velocity components of the member thus vary in an inverse sinusoidal manner. Hence if the horizontal component is at its maximum value, then the vertical component is at its minimum value, and vice versa. Hence, as the member moves through the first quadrant (i.e., between the 3 and 6 o'clock positions), the vertical component goes from its maximum value (i.e., at $\theta = 0°$) to zero (i.e., at $\theta = 90°$), while the horizontal component varies from zero (i.e., at $\theta = 0°$) to its maximum forwardly-acting value (i.e., at $\theta = 90°$). In the second quadrant (i.e., between the 12 and 9 o'clock positions), the horizontal component varies from its maximum forwardly-directed value (i.e., at $\theta = 90°$) to zero (i.e., at $\theta = 180°$), while the vertical component varies from zero (i.e., at $\theta = 90°$) to its maximum downwardly-directed value (i.e., at $\theta = 180°$). In the third quadrant (i.e., between the 9 and 6 o'clock positions), the horizontal component varies from its zero (i.e., at $\theta = 180°$) to its rearwardly-directed maximum value (i.e., at $\theta = 270°$), while the vertical component varies from its maximum value (i.e., at $\theta = 180°$) to zero (i.e., at $\theta = 270°$). Finally in the fourth quadrant (i.e., between the 6 and 3 o'clock positions), the horizontal component varies from its maximum rearwardly-directed value (i.e., at $\theta = 270°$) to zero (i.e., at $\theta = 360°$), while the vertical component varies from zero (i.e., at $\theta = 270°$) to its maximum value (i.e., at $\theta = 360°$). It should also be noted that the horizontal velocity component $V_{88x}$ is directed forwardly in the second and third quadrants, and is directed rearwardly in the fourth and first quadrants. Hence, the horizontal velocity component will be added to the ground speed of the frame $V_f$ in the second and third quadrants, and will be subtracted from $V_f$ in the fourth and first quadrants. In essence, the motion of member 24 relative to the ground is obtained by superimposing a sinusoidal waveform on a constant horizontal ground speed such that the resultant waveform has substantially-zero horizontal velocity relative to the ground in the vicinity of its lowered 6 o'clock position, and has a horizontal velocity relative to the ground of substantially twice the amplitude of the sine wave in the vicinity of the 12 o'clock position. At the same time, the vertical velocity component of member 24 is a sinusoidal function of equal frequency and amplitude, but substantially 90° out-of-phase with respect to the horizontal component.

It will thus be seen that the invention provides an improved actuating mechanism for a ground-engaging tool, which has the unique capability of lowering the tool to engage the ground at a substantially-zero net horizontal velocity relative to the ground.

Modifications

The present invention contemplates that many changes and modifications may be made. For example, the burner head and injector mechanism are only species examples of a wider range of tools and mechanisms that might possibly be mounted on the toolbar-like member 24. The cam and crank may be coupled together, as by an endless chain, or may be powered separately, as desired. The structure of the crank may be further simplified if the counterweight portion is not desired. In its fundamental essence, the crank simply forms an link between the third and fourth axes. The arm distance $r_1$ between the first and second axes, and between the third and fourth axes, may be made adjustable. Similarly, the rotational speed $\omega$ of the cam and crank, and arm distances $r_1$, $r_1$, are also preferably adjustable to accommodate variant and changing spacings between the burned holes. The shape and configuration of the cam, crank and/or member may be varied. The motor(s) for rotating the cam and/or crank may be electrically-, pneumatically- or hydraulically-powered, as desired.

Therefore, while the presently-preferred embodiment of the improved actuator mechanism has been shown and described, and several modifications and changes thereto discussed, persons skilled in this art will readily appreciate that various additional changes and modifications may be made without departing from the spirit of the invention, as defined and differentiated by the following claims.

What is claimed is:

1. An actuating mechanism for controlling the movement of a tool which is adapted to selectively engage the ground while being translated therealong, comprising:

a frame adapted to be translated along the ground at a ground speed;

a cam mounted on said frame for rotational movement about a first axis, said cam having a cam surface configured as a surface of revolution generated about a second axis positioned eccentrically with respect to said first axis;

a link having a first marginal end portion mounted on said frame for rotational movement about a third axis and having a second marginal end portion;

a member mounted on said link second marginal end portion for rotational movement about a fourth axis, said member having a follower arranged to engage said cam surface, said cam and link means being so oriented and arranged with respect to one another that a line between said first and second axes will be substantially equal in length and parallel to a line between said third and fourth axes so as to maintain the spatial orientation of said member as said cam and link rotate about their respective rotational axes with said frame, said member having a horizontal velocity component which is sinusoidal and having a vertical velocity component which is also sinusoidal but which is substantially 90 degrees out-of-phase with respect to said horizontal component, said member also carrying a tool; and motor means for rotating at least one of said cam and link means about its rotational axis with said frame in an angular direction and at an angular speed such that, when said member is in the vicinity of its bottom dead center position, the horizontal velocity component of said member will be of such magnitude and direction as to substantially cancel the ground speed of said frame;

whereby said tool may be selectively lowered to engage the ground at a substantially-zero net horizontal speed relative thereto.

2. An actuating mechanism as set forth in claim 1 wherein said cam surface is cylindrical.

3. An actuating mechanism as set forth in claim 1 wherein an annular recess extends into said cam, said recess being bounded by facing cylindrical surfaces, and wherein one of said cylindrical surfaces is said cam surface.

4. An actuating mechanism as set forth in claim 3 wherein said follower is operatively arranged in said recess.

5. An actuating mechanism as set forth in claim 4 wherein said follower has a fully-rotatable roller operatively arranged in said cam recess.

6. An actuating mechanism as set forth in claim 1 wherein said link means is a crank.

7. An actuating mechanism as set forth in claim 1 wherein the the relative spacing between said first and second axes is adjustable.

8. An actuating mechanism as set forth in claim 1 wherein the relative spacing between said third and fourth axes is adjustable.

9. An actuating mechanism as set forth in claim 1 wherein said motor means is arranged to rotate both of said cam and link in the same angular direction and at the same angular speed.

10. An actuating mechanism as set forth in claim 1 wherein said tool is a burner head.

11. An actuating mechanism as set forth in claim 1 wherein said tool includes an actuating rod mounted on said member for movement therewith and sliding movement relative thereto.

12. An actuating mechanism as set forth in claim 11 and further comprising a connecting rod having one end connected to said actuating rod for relative pivotal movement about a fifth axis and having another end connected to said cam for relative pivotal movement about a sixth axis.

13. An actuating mechanism as set forth in claim 12 wherein said sixth axis is positioned eccentrically with respect to said first axis.

14. An actuating mechanism as set forth in claim 13 wherein said sixth axis is positioned eccentrically with respect to said second axis.

15. An actuating mechanism as set forth in claim 12 wherein said tool includes a pair of generally clamshell-shaped jaws pivotally mounted on said member and biased to a closed position.

16. An actuating mechanism as set forth in claim 15 and further comprising a tubular chamber mounted on said member immediately above said jaws, and wherein a plunger is mounted on one marginal end portion of said actuating rod for movement into and out of said chamber.

17. An actuating mechanism as set forth in claim 16 wherein said connecting rod is mounted on said actuating rod and cam such that said actuating rod approaches the bottom of its stroke relative to said member after said member has moved past its bottom dead center position such that the contents of said chamber will be expressed by said plunger after said jaws have begun to move upwardly.

18. An actuating mechanism as set forth in claim 17 and further comprising supply means operatively arranged to supply material to said chamber.

19. An actuating mechanism as set forth in claim 18 wherein said supply means is arranged to pneumatically supply said material to said chamber.

20. An actuating mechanism as set forth in claim 11 wherein said tool includes a pair of generally clamshell-shaped jaws pivotally mounted on said member, said jaws being selectively movable between opened and closed positions, wherein said jaws are biased to said closed position, wherein said member includes a chamber positioned above said jaws, and wherein said actuating rod has a plunger mounted on one distal end thereof for movement toward and away from said jaws.

21. An actuating mechanism as set forth in claim 20 wherein said actuating rod approaches the bottom of its stroke relative to said member slightly after said member rotates past its bottom dead center position so that material in said chamber will be expressed therefrom as said member begins to move upwardly.

* * * * *